UNITED STATES PATENT OFFICE 2,008,148

STRUCTURAL ACTIVATED CARBON AND PROCESS OF MAKING SAME

Jacque C. Morrell, Oak Park, Ill.

No Drawing. Original application March 7, 1934, Serial No. 714,534. Divided and this application November 30, 1934, Serial No. 755,359

22 Claims. (Cl. 252—3)

This invention relates to the production of adsorptive or activated carbons. The present application is a division of my application No. 714,534, Structural activated carbon and process of making same, filed March 7, 1934.

It is the principal object of this invention to produce structural adsorptive or activated carbons. In activated carbons of this type it is very important that the supporting walls of the individual particles be dense or firm and that the particle or granule itself possess the necessary structural strength required of the granular type of carbons. As examples are the carbons which possess sufficient structural strength to permit their use in filter columns or beds without excessive disintegration, comparable to bone black, such as is employed in filter columns in the refining of sugar, or to the activated charcoals such as cocoanut char used for vapor adsorption from gases, in gas masks, catalysts, etc. The structural strength of these and other types of chars is of highest importance since the life of the material depends upon its maintaining its original size and granular form. The term "structural activated carbon" as used herein further means a material which may be employed in a granular condition and implies the necessary structural strength to withstand or resist shattering, abrasion and crushing for practical purposes and to be retained in a granular or particle form of relatively large size.

The product of the present process may be employed in various industrial processes as a decolorizing and purifying agent for the removal of color and impurities from liquids and solutions, the removal of vapors from gases, purification of air, as a catalyst, and in general it may be applied wherever adsorptive decolorizing or purifying material of structural character is required. It is to be understood, of course, that the structural product may be reduced in size and may be used in a finely divided or powdered condition. Among its specific uses are the refining and decolorization of oils and their derivatives; the refining and decolorizing of mineral, animal and vegetable oils; as a catalyst; for decolorizing, purifying and refining sugar solutions, syrups such as those from cane, corn, maple and sorghum, glycerine, and aqueous and non-aqueous solutions of organic and inorganic compounds; purification of water and as a deodorant. Other uses are: purification of gelatins, phenols, drugs, medicinals, pharmaceuticals, and the bleaching and purification of various crude and partly refined off-grade and off-flavored food and vegetable oils, including cottonseed, linseed, rapeseed, cocoanut, soya bean, and animal oils and fats, such as lard, fish oils, medicinal oils, paint oils, varnishes and resins, garage wastes, etc.

In a broad aspect the present invention comprises mixing finely divided carbons with a binder which chars on heating, compressing, molding, briquetting or extruding this mixture, or in general subjecting a mixture of carbon and a binder which chars on heating under a substantial pressure, heating the mixture to a temperature adequate to carbonize the said binder and thereafter to an activation treatment, such as treatment with steam at elevated temperatures or with other mild oxidizing gases or other agents. Preferably the molded or briquetted product is comminuted before carbonizing but there may be conditions under which it is carbonized or partially carbonized first and then comminuted. The product may be subsequently treated with a solvent such as hot water and/or dilute acid to remove ash or other undesirable substances therefrom. The final product of the present invention is of a granular structural form of suitable size and may be employed in filter columns, beds, etc.

The best types of structural charcoals or carbons are those which possess a large degree of porosity of the duct or sponge type, i. e., continuous, the pores, ducts or capillaries of which are of the proper size and character, while at the same time having the necessary supporting structural or mechanical strength to withstand disintegration in the uses for which such structural chars are employed. It is this quality that is supplied to the product by molding, compressing, briquetting or extruding under pressure. To further assist in obtaining the necessary strength while maintaining adsorption efficiency mixtures of specific types and in some cases specific proportions of carbons, as well as in some cases specific types and proportions of binders, are employed in connection with the present invention.

In compressing, briquetting, molding or extruding the pressure may vary from several hundred pounds per square inch or sufficient pressure only to mold the mixture to several hundred tons. Preferably in excess of one ton per square inch is employed.

In one of its more specific aspects the invention comprises mixing relatively active carbons with carbons which are less active, or relatively inactive, by mixing the two types and/or subjecting a mixture of the same to the treatment described. Relatively inactive carbons such as coke from distillation and/or cracking of petroleum, coal and the like, and cokes from the destructive distillation and cracking of various tars, such as coal tar, lignite tar, gas tar and retort cokes generally, etc., or from the destructive distillation of corresponding pitches, asphalts and the like, as well as coals such as anthracite, semi-anthracite, bituminous and sub-bituminous coals, and in general carbons derived from materials of a mineral character, are mixed with more active carbons such as wood charcoal, particularly from hardwood, and chars such as those from straws, hulls and vegetable matter in general, including chars from various waste materials such as wood-waste, shavings, the stalks, husks and cobs from corn, bagasse from sugar cane, nut hulls and shells, fruit pits, alcohol slops, waste liquors from various industries such as that from the paper industry and carbons of animal origin, such as bone black, blood char, leather char, etc., and the mixture of inactive and active carbons is mixed with a binder which chars on heating, such as a tar but preferably with pitches from various tars such as those from coal and wood, or asphalts and pitches from petroleum, either by straight distillation or cracking of the same, and the like. The three major components of the mixture are thus a relatively inactive carbon, in general of mineral origin, such as coals and cokes, and more particularly mixtures of the same, an active carbon and a binder which chars on heating. Vegetable carbons, particularly hardwood charcoals, are preferred as the relatively active carbons. Animal chars may also be used in the mixture. Coal and wood tars and preferably the pitches obtained from coal and wood tars are the preferred binders.

In a more specific aspect the invention comprises mixing a mineral carbon selected from a group comprising coals and cokes and containing a relatively low percentage of volatile matter, for example, cokes containing less than 10 per cent volatile matter and anthracite coal, and in some cases semi-anthracite and semi-bituminous coal, and in general a mineral carbon of non-coking characteristics, with a bituminous coal showing a distinct and marked property of coking or caking, together with an active carbon, particularly of vegetable and animal source and characteristics, the said mixture of the various types of carbon being admixed with a binder which chars on heating, briquetting, molding, extruding or otherwise compressing the mixture, subjecting the same to a temperature adequate to char and carbonize it, preferably after comminuting, and then activating, preferably with a gas having a mild oxidizing action, for example steam, preferably finally subjecting the activated product to the action of a dilute acid, or in general to a solvent, to remove undesirable components.

The active carbon for present purposes may be defined further as that produced from the carbonization but not necessarily by subsequent activation, particularly of vegetable and animal matter, and may include the carbons from the incomplete combustion (smoky flame) of gases wherein the carbon is deposited at relatively low temperatures, e. g., carbon black and lamp black. It may also be desirable to use a substance of vegetable or animal characteristics direct as the source of active carbon, for example, those vegetable and animal materials cited above instead of the carbon or char obtained therefrom, as the source of the active carbon, although it is to be distinctly understood that based upon the characteristics of the final product, including both structure and actvity, they are not the equivalents of the chars or carbons. The inactive carbon may be defined, e. g., as that resulting from the coking of solid or liquid mineral carbonaceous or hydrocarbon substances such as those cited, e. g., petroleum and coal, including anthracite, bituminous coal, and tars obtained therefrom, as well as the coals themselves, and in general the carbon residues remaining from the destructive distillation of tars, particularly from those of mineral origin but which may include tars obtained from other sources. Because of its distinctly vegetable character, carbon obtained from peat may be considered as a vegetable carbon and an active carbon, although not the equivalent of vegetable matter as such. Carbon from the destructive distillation of lignite may be considered as a mineral carbon and for purposes of the present classification may be inactive, especially with respect to the more active types cited, e. g., hardwood charcoal. Carbon from the destructive distillation of lignite may be active, however, with respect to the inactive class, e. g., cokes from petroleum and coal and the various coals themselvs, and since a more desirable activated carbon from a structural or mechanical viewpoint may result from mixtures therefrom this feature is contemplated within the scope of the invention, although it is not a preferred mixture. It is to be understood that various combinations of the three major components selected from the various groups shown above are not equivalent and that the choice of the individual components will depend on the quality of product desired not only with respect to adsorption or decolorizing efficiency but also with regard to structural strength.

The mixture of carbons and binder is compressed, molded, briquetted or extruded, preferally comminuting the molded or compressed product, heating to carbonize the binder and then activating, usually by heating in the presence of steam or other mild oxidizing gas. The final product may then be treated with a dilute acid such as hydrochloric acid, e. g., approximately 1 to 3 per cent, to remove undesirable ash components and may then be finally water washed.

The final product is granular in form, structural in character, and may be comminuted to proper size as desired.

Some of the existing theories regarding active and inactive carbon indicate that an active carbon is essentially free from adsorbed stabilized hydrocarbons which are normally associated with it and which reduce its power of combining with other substances, and is also free from inactive carbon formed by the decomposition of hydrocarbons upon its surface at relatively high temperatures, e. g., above approximately 1000° F.

In the present invention the types of carbon which I denote and classify as active carbons are of such character that when such binders for example as coal tars or petroleum pitches and asphalts are added to them, as well as any hydrocarbons which may be associated therewith prior to the incorporation of the binder, when heated and decomposed under the existing temperatures employed for carbonization, e. g., 1200° to 1500° F., do not cause the deposition of inactive carbon which cannot be activated by the methods described herein, e. g., by steam activation or by other usual methods, and these include in general the carbons of vegetable and animal origin. It is thus clear that by active carbons I do not mean one which has necessarily been activated, but refer rather to origin and type, e. g., animal or vegetable origin. On the other hand, when the carbons which I designate as inactive carbons, and these in general are of mineral origin, such as cokes from petroleum, coal (and for present purposes the coals themselves), etc., or from the destructive distillation of tars therefrom, are associated with a binder such as a petroleum asphalt or coal tar pitch and heated above, e. g., 1200° F., they do not permit the production of a satisfactorily active product for practical purposes. One aspect of the present invention is readily illustrated by the following examples:

A mixture of coke or anthracite coal, or mixture of one or both of these with bituminous coal, and coal tar pitch employed in the ratio of 1.9 parts by weight of coke, coal, etc., to one part of coal tar pitch when made up and treated in accordance with the method described in the present invention showed a decolorizing efficiency of approximately 35 per cent on a standard raw sugar solution. When approximately 12½ to 20 per cent of finely divided hardwood char was mixed with the coke or coal, also in a finely divided condition, employing the same ratio of coal tar pitch and of the same character and processed in identically the same manner as in the first example, the decolorizing efficiency of the last product when tested in the same manner was approximately 80 to 90 per cent. The structure and mechanical strength of this product was much improved and was also very greatly superior to the product made from the active carbon itself, or even the mineral carbon alone with a binder. A similar comparison was obtained when a petroleum residue or asphalt, e. g., a cracked petroleum residue, was employed as the binder in both cases.

In general, coals are classified as sub-bituminous, bituminous, semi-bituminous, semi-anthracite and anthracite, with intermediate grades such as low, medium and high rank for each class. Lignite and peat are still lower than sub-bituminous coal in the order shown.

Moisture decreases in the order shown, as does the other volatile matter present. The coals containing very high percentages of combustible volatile matter, such as the sub-bituminous and low rank bituminous coals, show marked swelling on heating but do not form a compact and solid coke. On the other hand, the high rank, semi-bituminous, semi-anthracite and anthracite coals show relatively little or no swelling or coking, decreasing in this respect in the order shown. The medium and high rank bituminous coals and the low and medium rank semi-bituminous coals show a definite caking or coking property on carbonizing and form firm cokes, that is, they undergo a change in form during carbonization, the resulting product having either swelled or shrunk during the expelling of the volatile matter, but the resulting coke is firm and hard and suitable as a solid fuel.

In the present invention use is made of the coking or cak'ng property of the last named group of bituminous coals by combining the same on the one hand with low volatile anthracite, semi-anthracite or high rank semi-bituminous coal or coke obtained therefrom, or from petroleum, or from the coking of tars and pitches, and on the other hand with an active carbon obtained in general from vegetable or animal matter, such as for example from wood or boneblack or bone char.

All of these materials are mixed in finely divided form, and in addition a binder of the character hereinbefore described, such as pitches, tars and the like, and in general a binder which chars on heating, may also be incorporated therewith (other binders, for example those of a carbohydrate character, such as starches and sugars, may also be employed therewith), the mixture compressed, carbonized preferably after comminuting, and thereafter activated as hereinafter described.

It is also within the scope of the invention to incorporate other types of carbon, such as those obtained from lignite and peat, as part of the mixture.

The bituminous coal of the group referred to, to be mixed with the coke or anthracite coal, etc., and the vegetable or animal carbon, serves the purpose not only as additional binding material but also determines to a great extent the structural characteristics of the finished product, although it must be borne in mind that each component serves a definite and useful purpose. In general, therefore, the mixture contains a caking and coking coal, such as bituminous coal of the proper characteristics, a non-caking carbonaceous material comprising a coke or low volatile coal such as anthracite, and a carbon from an animal or vegetable source. Since it is evident that the bituminous coal has a very definite binding property it may be within the scope of the invention under certain conditions to employ little or no additional binder, or a small amount of binder, e. g., of the carbohydrate type or water-soluble type generally, although this is not the preferred method nor is it equivalent to those described.

The binders used in the present case are generally those which char on heating, preferably of a hydrocarbon character, such as pitches and tars, preferably pitches, the latter being in general the residues produced from organic substances such as oils, tars, etc., when subjected to destructive distillation in complete or partial absence of air and to such an extent that a complete carbon residue is not produced and which may be a heavy or viscous liquid, semi-solid or solid, the latter usually softening or liquefying when heated.

Some of the common classes of pitches are: (a) Tar pitches, which include those produced from the tars of wood, bone, coal, shale, lignite, peat, straw, vegetable matter and bitumens, water gas and oil gas tars; (b) Oil pitches, including the residues from distillation and cracking of animal, vegetable and petroleum oils of asphalt, paraffin, naphthene or other base; (c) Pitches from destructive distillation of animal and vegetable matter including those of stearin, palm oil, bone fat, packing house fat, garbage, sewage, grease, etc.; (d) Pitches resulting from the destructive distillation of native bitumens, asphalts, asphaltites, etc. Various oils (in many cases from the tars mentioned above) may be used in conjunction with the above pitches as binders, e. g., coal tar oils, wood tar oils, petroleum oils, particularly cracked petroleum residues, etc. Preferably pitches from coal and wood tars or the corresponding tars thereof and pitchy or heavy liquid residues from petroleum, both from straight distillation and cracking, are preferred, the coal tar pitches being the most desirable, especially for structure and hardness of the resulting product, but the wood tar pitches give somewhat higher activity. Depending upon the results desired, the binders employed may be solid, e. g., pitches, semi-solid or liquid, or combinations thereof, together or with tars or oils, but the solids are preferred.

In connection with the selection of the binders, consideration is given to the efficiency and structural strength of the product desired. This refers to the sources of the binder as well as to its physical form, i. e., whether it is a heavy hydrocarbon fluid residue, tar, pitch or asphalt, etc.

In the following methods the relatively inactive carbons, e. g., coals and cokes, or mixtures, e. g., coke and bituminous coal, and the active carbons, e. g., animal and vegetable chars, will be referred to as "carbons".

While I prefer to employ the process of mixing the carbons with an emulsion of a binder, the preparation of which is disclosed in my Patent, #1,440,356, or with emulsions of suitable binders prepared in some other manner, other methods of incorporating the carbons with the binder may be employed as disclosed in my issued patents and/or hereinafter. Some of the methods of accomplishing the mixing are:

(a) The carbons may be mixed directly with the emulsified binder either as such or the carbons may be suspended in or wetted by an aqueous medium and mixed with the emulsified binder. In many cases the water contained in the emulsion will be separated from the mixture by filtration and by evaporation, or preferably by evaporation alone, but in some cases the mixture containing the emulsion may be compressed or briquetted directly before comminuting and/or heating to carbonize the binder.

(b) The carbons may be mixed with a solution of a binding material which chars on heating, separating the solvent by distillation and/or evaporation either before or after compressing the mixture as found necessary or desired. The solvent may be a relatively low boiling hydrocarbon liquid containing pitch or asphalt dissolved therein, or higher boiling solvents may be used.

(c) The carbons may be mixed with a liquid binder which chars on heating, such as a tar directly produced or similar product thereto, such as an oil added to a pitch.

(d) The carbons may be mixed with a soft pitch directly or one which is rendered fluid by heating. In some cases mixing may be facilitated under heat, i. e., the mixture is heated while mixing.

(e) The carbons may be mixed with a non-fluid (solid) pitch or other non-fluid binder which chars on heating and may also thereafter be mixed with or wetted or moistened by a fluid such as oil, tar of the character previously referred to in connection with the present invention, or other organic liquid which will dissolve, disperse or flux with the binder. It is desirable to mix the mixture of carbons and non-fluid pitch binder with an oil or tar before compressing but where no liquid is employed the mixture is heated before and/or during compression. It is to be understood, however, that it may be heated even when the wetting liquid is employed. The moistening or wetting liquid added to the mixture of carbons and the binder may also be in an emulsified state and this is especially desirable in many cases. Oils and tars, including cracked fluid hydrocarbon residues, are preferred in this connection. The oil emulsion may be prepared as described previously. In some cases the carbons may be wetted with oil either direct or in an emulsified condition and the finely divided hard pitch therafter incorporated, or various combinations of the methods described may be employed.

It has been found when carbons are mixed direct with a finely divided binder, for example finely divided non-fluid or solid pitch and thereafter with an emulsion of oil which will coalesce or flux with the said pitch, that a marked saving may be effected in eliminating filtration and drying of the resulting mixture prior to briquetting. Preferably the emulsion is of the oil in water type. The manner in which this is carried out is as follows: A mixture of the carbons, for example, coke, bituminous coal and wood char, are mixed with finely divided coal tar pitch or hardwood pitch in the proportion of approximately 3.5 parts of carbon to one of finely divided pitch binder. After thoroughly mixing the finely divided materials an emulsion of oil in water, stabilized by an emulsifying agent such as has been disclosed in my issued patents and co-pending applications, for example, creosote oil in water stabilized by an alkaline solution of casein, is added to the mixture of carbons and the finely divided binder and thoroughly incorporated therewith. The oil in the emulsion is in the internal phase, that is, the oil in water type, and the oil therein fluxes with the pitch binder in the mixture, giving an intimate distribution of binder which can be directly compressed or requires only mild heating to permit compression. The mixture of carbons as such or containing the binder in finely divided condition may also be wetted with water or water containing a protective colloid or emulsifying agent prior to admixing the emulsifying agent therewith.

(f) The carbons may be mixed with a non-fluid water soluble or dispersible binding material which chars on heating, such as glucose, starch, waste sulphite liquor pitch, etc. and moistened with water, or a solution of a solid water soluble binder may be employed.

In general, the preferred methods of mixing the mixture of active and inactive carbons with the binder are (a) and (e). In (a) the water is preferably kept at minimum to permit direct evaporation and/or compression. In some cases the compressed or molded material is gently dried before carbonizing. In (e) the oil or tar is added either directly to the mixture of binder and carbon or preferably as an emulsion.

However, all of the above methods are effective, although it may be readily understood that they are not equivalents.

In all cases above the mixture is compressed, molded, briquetted or extruded under pressure, subjected to heat treatment to carbonize the binder, preferably after comminuting to proper size, and activated in most cases by steam treatment and/or other treatment. In some cases the molded product may be partly or wholly carbonized and thereafter comminuted to proper size, although it has been generally found preferable to comminute before carbonizing.

In some cases it may be desirable to add to the mixture of carbons and binder a substance which is to be later removed by solution with a solvent, e. g., calcium carbonate, calcium oxide, dolomite, finely divided metals, metal oxides, salts, etc. These substances may be removed from the product preferably after activation by treatment with a solvent, e. g., water when the material is water-soluble, and a dilute acid, e. g., hydrochloric, when the material is acid-soluble. Also, in the case of mixtures with carbon containing ash naturally, e. g., wood charcoal, the final product may be subjected to treatment with hot water and/or an acid, e. g., hydrochloric acid, finally water washed and dried to remove the undesirable ash. In most cases in the present invention an acid treatment of the product is desirable. It may also be desirable to add substances to the material which volatilize and/or react with the carbonaceous material during the treatment, such as zinc chloride, phosphoric acid and similar materials.

It is to be understood that the methods and various modifications thereof described above, or in general in the foregoing, are not to be considered as equivalents in the sense of quality of product or results produced, the particular method and combinations chosen depending upon the raw materials employed and the results desired.

The term "carbon" as herein employed is intended to cover pure carbon as well as a mixture of natural or artificial origin containing a high percentage of carbon. This includes the various charcoals and carbons of animal, vegetable or mineral origin.

The following description shows one of the methods of operating the process. Finely divided carbon comprising a mixture of petroleum coke or other coke, or anthracite coal, a coking bituminous coal such as Pocahontas coal, and hardwood charcoal, may be wetted with water as such or containing a protective colloid. This preliminary wetting is desirable, although not necessary. The protective colloid may consist of any of the classes of materials described in my issued Patent #1,440,356, e. g., ammonium tannate or casein. The latter is prepared by dissolving the casein in a dilute solution of an alkali, e. g., sodium hydroxide, sodium carbonate, ammonia, etc.

An emulsion of pitch is prepared, e. g., by first suspending finely divided hard pitch, e. g., coal tar pitch sufficiently hard to grind or otherwise comminute, e. g., 200–300° F. melting point in water containing a protective colloid, e. g., casein dissolved in an aqueous solution of sodium carbonate and an emulsion of an oil may be prepared, e. g., a coal tar (or other tar) distillate, e. g., anthracite oil, creosote oil, or the like, by agitating the oil with an equal volume of an emulsifying agent, which consists of water containing dissolved therein one of the classes of protective colloids previously referred to, e. g., casein dissolved in an alkali solution. The suspension of pitch and emulsion of oil are mixed and the resulting emulsified binder is mixed with the finely divided carbon mixture. The water is removed in most cases and preferably simply by evaporation alone, or in some cases it is compressed directly without the removal of the water, and the mixture is then compressed, molded, briquetted or extruded.

In some cases the material may be directly compressed without drying, or it may be dried after compression. The compressed or molded material may then be crushed or comminuted and is then subjected to heat treatment to carbonize it. The carbonized product may then be subjected to activation by steam treatment or by other oxidizing gas, such as air, chlorine, flue gas and the like, or other activating treatments. In the present example when wood charcoal, e. g., hardwood charcoal, or similar carbon base, is employed the carbonized and steam treated char is preferably subjected to treatment with hot water and/or dilute acids, such as hydrochloric acid, to remove ash and other impurities, subsequently water washed and then dried. In the compressing or molding process pressures varying from several hundred pounds per square inch or only sufficient to compress the mixture up to several hundred tons may be employed.

In the carbonizing treatment temperatures of from approximately 1000° F. to 1800° F., more or less, may be employed. Temperatures of 1300° F. to 1500° F. are preferred. For steam activation or other gas activating treatments temperatures of from 1500° F. to 1800° F., more or less, may be employed with preferred temperatures of 1600° F. to 1750° F. The acid concentrations for the treatment of the activated products (when employed) may vary from less than 1 per cent to 10 per cent and upwards and various acids may be employed, such as hydrochloric, sulphuric, etc., preferably the former. During carbonization and activation the time of treatment will depend upon temperature conditions as well as other conditions and schedules varying from fifteen minutes up to several hours and longer have been employed.

A more specific example describing the preparation of decolorizing and/or adsorbent charcoal according to my process is given below:

The raw materials used in this particular case are petroleum coke, e. g., from the cracking or distillation of petroleum or its fractions or anthracite coal, a bituminous coal showing a definite coking property to form a reasonably strong coke, e. g., Pocahontas coal, and charcoal, preferably from hardwood such as maple, oak, hickory, birch, beech and the like, of approximately 50 mesh and upward, around 200 mesh being preferred. Coal tar pitch (which is preferred for the structural type of charcoal in this case) of approximately 200 to 250° F. melting point, or of sufficient hardness to be ground, is employed in making the suspension of the binder. The pitch is ground approximately 50 mesh and upward, preferably by first crushing and then grinding, using a protective colloid such as casein which is dissolved in an alkali solution, preferably sodium carbonate solution or dilute ammonia. Creosote oil from the distillation of high temperature coal tar or other liquid hydrocarbon, preferably a coal tar distillate, is emulsified in the solution made by dissolving casein in an alkali, such as sodium carbonate. This makes an emulsion of the oil in water type, which is preferred. The emulsion of oil is added to the suspension of pitch, or vice versa, to prepare the emulsified binder, as disclosed in my Patent #1,440,356. Other methods may be employed in preparing the emulsified binder. As an example of the preparation of the casein solution, approximately 1 per cent by weight of sodium carbonate may be dissolved in water, the solution heated to approximately 150° F. and into the heated alkaline solution is stirred approximately 2 per cent by weight of casein. The solution is preferably allowed to cool before using.

The solution may be diluted before making up the pitch suspension, which may be prepared by adding an equal part by weight of the diluted solution to the finely divided pitch and stirring and/or grinding. To this is added an emulsion of oil, preferably from coal tar, e. g., creosote or anthracene oil prepared by emulsifying the oil in an equal part of the aforementioned casein solution. In preparing this emulsion the oil may be added slowly to the casein solution and vigorously agitated during or between additions until the required quantity of oil has been added. The oil emulsion is then mixed with the pitch suspension, the resulting system containing a stable emulsion of soft pitch in the proportion, e. g., of 40 to 60 parts of the creosote oil for each 100 parts of the hard pitch. It is desirable to add to the emulsion of soft pitch prepared as described a small amount of ammonium tannate solution (a solution of tannic acid containing a small amount of ammonia) to stabilize the same.

The mixture of coke or anthracite coal, bituminous coal and hardwood charcoal employing from 15 to 30 per cent of bituminous coal, 10 to 25 per cent of hardwood charcoal, preferably around 15 per cent in this particular example, and the remainder coke or anthracite coal, all preferably in finely divided form, e. g., of approximately 50 to 200 mesh, is then mixed with the emulsion. In some cases the carbon mixture may be moistened with some of the dilute casein solution. As one example, the final mixture of creosote oil, pitch and carbons may contain approximately 25 to 50 parts of oil, 100 parts of pitch and 350 parts of carbon mixture (coke 60 per cent, bituminous coal 25 per cent, and wood charcoal 15 per cent) by weight, and in addition there will be present very small proportions of soda ash or sodium carbonate and casein. These proportions may vary considerably, the above example being given in connection with a superior structural charcoal. The proportions of carbon mixture (coke, coal and wood char) may generally vary from approximately 160 to 600 parts relative to the pitch, depending upon the amount of volatile matter and/or pitch present originally in the coke and other factors, e. g., for a completely devolatilized coke, e. g., 2.5 to 4 parts of carbon mixture to 1 part of pitch may be employed, and for a coke containing a substantial per cent of volatile matter, e. g., from a cracking operation, 5 parts of carbon mixture to one part of pitch may be employed. The per cent of bituminous coal in the carbon mixture will also determine the ratio of carbon mixture to pitch binder so that the figures are given simply as examples.

As a general rule, only sufficient water is present in the emulsion to permit thorough mixing with the carbon, and the water may then be removed or separated by evaporation or other means. In some cases the carbon may be wetted with the aqueous medium and then mixed with the emulsified binder. It is preferred to have only sufficient water present so that the materials may be thoroughly admixed and then dried directly by evaporation and in some cases the method described in section (e) is employed and the mixture may be compressed before or even without drying. This is a preferred procedure.

It is not necessary that the mixture be completely dried as the presence of small amounts of water facilitates molding or briquetting. As stated, it is preferred that the mixture of emulsified binder and carbon be compressed or molded directly, the amount of water in such cases being kept to a minimum. The mixture, preferably while warm or heated, is compressed, molded or briquetted, preferably under pressures, e. g., from one ton to ten tons per square inch, e. g., I have found pressures of 2.5 tons per square inch quite satisfactory as a working pressure, although any suitable pressure which gives the desired results will suffice. The compressed material is then carbonized. Preferably the compressed or molded product or briquettes are first crushed to the desired size before carbonization. In some cases they may be ground to, e. g., 8 mesh and upwards, carbonized and then subsequently further treated, or they may be reduced to smaller size if desired for further treatment. If used for filtering liquids the product prior to carbonizing may be reduced to smaller size as desired, e. g., 10 mesh to 20 mesh and smaller. The principal question here is to avoid losses in going through several grinding operations. Fines accumulating before carbonizing may be recompressed again. In some cases the molded material is carbonized directly and then comminuted or crushed and/or ground to proper size. It is preferred, however, that the molded product be comminuted before carbonizing.

While I have described in detail the preparation of a mixture by one of the methods employed in the present invention in preparing the mixture of carbons and binder, it is to be understood that other methods such as those previously described may be employed, e. g., the carbons (e. g., coke, bituminous coal and wood char) may be mixed directly with a soft pitch binder (preferably under heat) or a solution thereof, or with a finely divided hard pitch binder alone or by the addition later of a small amount of oil or tar or other solvent for the binder and in various combinations, and in general with a binder which chars on heating, and subsequently compressed and subjected to carbonization and/or to the other treatments described in accordance with the process. For example, a very satisfactory structural charcoal of high decolorizing and refining efficiency has been prepared by employing 3.5 parts of a mixture of carbons (containing 65 per cent of devolatilized petroleum coke, 20 per cent of bituminous coal, and 15 per cent of hardwood charcoal, 1 part of coal tar pitch approximately 200 melt point, all in finely divided form and well mixed, and 0.35 parts of creosote oil in emulsified condition of the oil in water type added and thoroughly mixed with the mixture later. The product was then molded, comminuted, carbonized, activated and acid treated as described. When the petroleum coke containing a relatively high per cent of volatile matter was employed a higher ratio of the mixed carbons (coke, coal and wood char) to the pitch binder was used. These proportions and the methods of mixing are simply illustrative and by way of example only.

In the above examples the petroleum coke serves essentially to permit a product to be produced of good structure. The bituminous coal assists both in structure and binding properties, while the wood char furnishes the basis for adsorptive and decolorizing efficiency, although it is to be understood that the whole mixture is cooperative in all of the properties and functions of the finished product. Coke from coal, or from the carbonization of pitches, tars and the like, in general of mineral origin as well as anthracite or semi-anthracite coal, may also be employed generally to replace the petroleum coke component, although they are not to be construed as complete equivalents.

In the carbonization operation, heating schedules from twenty to sixty minutes at temperatures varying from 1200° F. to 1500° F. have been found satisfactory. Generally speaking, carbonization in thin layers is preferred. The use of a continuous rotary type of retort has been found satisfactory both for carbonizing and activating with steam. The principal object here is to heat the material uniformly and prevent formation of secondary inactive carbon. After the carbonization treatment the product is subjected to a second heat treatment in the presence of steam at temperatures between approximately 1500° F. and 1800° F. for about twenty minutes to two hours. In some cases it has been found desirable to introduce steam into the charge while undergoing carbonization.

While I have described the preparation of a structural activated char employing certain mixtures and conditions, it is to be understood that these examples are merely for illustrative purposes, as many possible combinations between the various classes of carbons and binder material that char on heating, such as those shown or mixtures, may be made.

In general, the carbons may be distinguished from the binders in that the carbons are not liquefied nor do they soften by relatively low temperature heat treatment and usually the amount of volatile matter is less than non-volatile, whereas generally the binders do soften or liquefy by heat treatment and are usually higher in volatile matter. However, the carbons may contain considerable volatile and/or binding matter on the one hand and may undergo some caking when heated to high temperatures, and the binders may contain considerable free carbon on the other. The binders may be materials of a pitchy, asphaltic, resinous or similar characteristic, which may be in a non-fluid or solid state, or which may be of such melting point characteristics as to conform to the shape of the containing vessel. Pitches, particularly those obtained from coal and wood tars and similar tars, are preferred as binders, although those from other tars and petroleum may be employed.

It is usually preferred that the carbon base be ground to 200 mesh or above, although approximately 50 mesh and above may be found satisfactory.

Apparently the carbonization of the binder while in contact with the active carbon present in the mixture causes the formation of an active carbon or one which is easily rendered active.

Various mixtures of carbon bases, such as coke from various oils, tars or pitches, preferably from petroleum, coal, etc. and wood charcoal, or chars from vegetable and animal sources generally, e. g., hardwood charcoal and boneblack, have been used, the proportions varying quite widely depending upon the materials used and the results desired. The mechanical structure improves within limits with the lower percentages of active carbon; however, the activity of the finished product must be considered in determining the minimum percentage of active carbon to be employed. The ratio of carbon base to pitch (on the basis of hard pitch) may be 1.5 to 6 of carbons to 1 of pitch. In general, as the volatile matter in the pitch changes its relative proportion is changed within certain limits.

The proportions of various materials are given as examples and they may vary more widely depending upon the results desired, e. g., a larger proportion or ratio of carbons to binder may be employed in some cases.

I have found that certain mixtures produce superior results with respect to structural strength or resistance to shattering, abrasion, attrition and the like of the granular product, e. g., when employing cokes or anthracite coal as a carbon base, bituminous coal and a vegetable carbon, e. g., hardwood char, not only the decolorizing properties of the product are improved but the structural strength of the product is very greatly improved. As a specific example of such a mixture may be cited: petroleum coke, 40 to 60 parts by weight; bituminous coke, 20 to 30 parts; hardwood charcoal, 10 to 20 parts. The binder ratio may be less than 2:1 for low volatile coke, as in the previous case, and higher than 4:1 for high volatile cokes, preferably employing coal tar pitch as the binder, which produces a product of superior structural strength.

The binder in the above cases may be incorporated in the mixture in any of the manners described but preferably is incorporated in an emulsified state or as a finely divided hard pitch and mixed afterward with an oil or tar, or vice versa, as described above.

The product of the present process has a superior adsorption or decolorizing efficiency, very much higher than the product from inactive mineral carbon alone, with an improved structure and mechanical strength, the latter being particularly very much greater than when active carbon alone is employed.

As specific examples of results obtained the following are given:

| Percent coal | | Percent wood char | Ratio carbons to coal tar pitch binder | Product | |
|---|---|---|---|---|---|
| (Low volatile) anthracite | (Bituminous) Pocahontas | | | Percent decolorizing raw corn sugar solution | Structural strength |
| 68 | 17 | 15 | 4:1 | 83 | Very good |
| 60 | 20 | 20 | 4:1 | 88 | Very good |
| 50 | 25 | 25 | 4:1 | 89 (less activation) | Very good |
| 33⅓ | 33⅓ | 33⅓ | 4:1 | 89 (less activation required but structure not entirely satisfactory). | |
| 40 (20% boneblack added to this mixture) | 20 | 20 | 3:1 | 89 (structure fairly good, short activation) | |
| 60% coke | 20 | 21 | 4:1 | 89 | Very good |

The proportion of oil employed in emulsified form in the above mixtures varied from 25 to 50 per cent of the pitch employed. When wood tar pitch was substituted for coal tar pitch the activity was improved but the structure was not as good.

Variations in percentages and amounts of the various components changed the balance between structure and the activity to some extent. One of the chief purposes of introducing the boneblack in the mixture was to obtain an ash component which acts as a buffer in the refining for example of cane sugar solutions and to permit selective adsorption of the ash therein.

When coke, e. g., devolatilized petroleum coke and coke from the coking of coal tar pitches and the like, are employed instead of the anthracite coal similar though not equivalent results are obtained. Binders from petroleum, e. g., pitches, asphalts, etc. from straight run and cracked oils, may also be employed.

The products of the process were regenerated numerous times with very little depreciation in structure and activity.

A highly superior and desirable product from the viewpoint of relatively low cost possessing a mechanical structure and decolorizing efficiency superior to high grade boneblack was produced according to the process as described. The mechanical strength of some of the products was more than twice that of high grade boneblack and the actual decolorizing efficiency and regenerative properties far superior to the latter.

When the product was very finely divided better results than those shown above were obtained. The products containing hardwood char (above) were acid treated as described.

Other vegetable chars also give good results when replacing hardwood char, although the latter is preferred.

For comparison, a good grade of boneblack on the above decolorizing scale and under comparable conditions of test would show an average of 65 per cent or less, employing equal volumes. Generally the boneblack is higher in density than the chars of the present process, and the tests show that the present chars are even more active and efficient than is shown by this comparison if made on the basis of employing sufficient boneblack to decolorize to the same extent as the present chars.

In the above examples the pitch was in an emulsified condition or added direct as a hard pitch. The oil used in the examples is on the basis of approximately 20 to 50 per cent by weight of pitch employed. (If soft pitch is used directly, equivalent amounts may be employed.) This ratio may, of course, be changed depending on the results desired and materials employed. Creosote oil or anthracene oil may be employed and are preferred, but other coal tar distillates and wood tar or similar distillates, tars and petroleum oils, e. g., cracked liquid residues, may be employed. The weight of pitch employed is on the basis of a hard pitch melting at approximately 200° F. to 250° F. This data is given simply to characterize the proportion used in the above examples rather than to limit it, and of course it must be borne in mind that the results obtained may not be equivalent for various combinations.

By "binder ratio" is meant the amount of carbon to pitch employed, e. g., 3:1 means 3 parts by weight of carbon to 1 part pitch. By the term "compressing" in the claims is meant subjecting the mixture to pressure of any form, e. g., molding, briquetting, extruding, rolling and the like.

Results comparable to those shown may be obtained by the other modifications described herein but the method used in these specific cases is preferred.

The above examples are given for illustrative purposes only, and it may be readily recognized that many combinations of carbon base and binder may be employed and many mixtures of various carbon bases may be employed and combined with various types of binders, either alone or in admixture. It may be also recognized that the conditions of treatment, such as temperatures of carbonizing and activation, may vary, all within wide limits. Also, that in regard to the quality of the resulting product the extent of decolorization or refining may be much higher than that shown in the table, depending on conditions of the test, the amount and kind of material to be treated, and the particular product being tested. Hence, the specific examples are not to be considered as limitations upon the broad scope and spirit of the invention.

By the term "organic material of non-mineral origin" as used in the claims is meant an organic substance derived from vegetable or animal matter and which is not found as a mineral. However, such substances as peat, whose organic vegetable character may be clearly distinguished by the naked eye, are included in this definition.

I claim as my invention:

1. A process for the production of structural activated carbon suitable for refining, purifying and decolorizing purposes, which comprises mixing carbon of the class consisting of low volatile, non-coking coals and cokes with a coking coal and a finely divided solid organic material of non-mineral origin, compressing the mixture under substantial pressure, subjecting the compressed material to a temperature adequate to carbonize the solid organic material and coking coal, and activating the resulting product.

2. A process for the production of structural activated carbon suitable for refining, purifying and decolorizing purposes, which comprises mixing mineral carbon of the class consisting of low volatile coals and cokes with a bituminous coal, a finely divided solid organic material of non-mineral origin, and with a binder which chars on heating, compressing the mixture under substantial pressure, subjecting the compressed material to a temperature adequate to carbonize and to char the solid organic material and the binder, and activating the resulting product.

3. A process for the production of structural activated carbon suitable for refining, purifying and decolorizing purposes, which comprises mixing mineral carbon of the class consisting of non-coking coals and cokes with a coking coal, a finely divided solid organic material of non-mineral origin, and with a binder which chars on heating, compressing the mixture under substantial pressure, subjecting the compressed material to a temperature adequate to carbonize and to char the solid organic material and the binder, and activating the resulting product.

4. A process for the production of structural activated carbon suitable for refining, purifying and decolorizing purposes, which comprises mixing anthracite coal with a bituminous coal and a finely divided solid organic material of non-mineral origin, and with a binder which chars on heating, compressing the mixture under substantial pressure, subjecting the compressed material to a temperature adequate to carbonize and to char the solid organic material and the binder, and activating the resulting product.

5. A process for the production of structural activated carbon suitable for refining, purifying and decolorizing purposes, which comprises mixing anthracite coal with a bituminous coal of coking characteristics, and a finely divided solid organic material of non-mineral origin, and with a binder which chars on heating, compressing the mixture under substantial pressure, subjecting the compressed material to a temperature adequate to carbonize and to char the solid organic material and the binder, and activating the resulting product.

6. A process for the production of structural activated carbon suitable for refining, purifying and decolorizing purposes, which comprises mixing carbon of the class consisting of low volatile, non-coking coals and cokes with a coking coal and a finely divided solid organic material of a vegetable character, compressing the mixture under substantial pressure, subjecting the compressed material to a temperature adequate to carbonize the coking coal, and activating the resulting product.

7. A process for the production of structural activated carbon suitable for refining, purifying and decolorizing purposes, which comprises mixing mineral carbon of the class comprising low volatile coals and cokes with bituminous coal and a finely divided solid organic material of a vegetable character, and with a binder which chars on heating, compressing the mixture under substantial pressure, subjecting the compressed material to a temperature adequate to carbonize and to char the solid organic material of a vegetable character and the binder, and activating the resulting product by heating in the presence of a gas having a mild oxidizing action.

8. A process for the production of structural activated carbon suitable for refining, purifying and decolorizing purposes, which comprises mixing mineral carbon of the class comprising low volatile coals and cokes with bituminous coal and comminuted wood, and with a binder which chars on heating, compressing the mixture under substantial pressure, subjecting the compressed material to a temperature adequate to carbonize and to char the comminuted wood and the binder, and activating the resulting product by heating in the presence of a gas having a mild oxidizing action.

9. A process for the production of structural activated carbon suitable for refining, purifying and decolorizing purposes, which comprises mixing mineral carbon of the class comprising low volatile coals and cokes with bituminous coals, and a finely divided organic material of animal origin, and with a binder which chars on heating, compressing the mixture under substantial pressure, subjecting the compressed material to a temperature adequate to carbonize and to char the material of animal origin and the binder, and activating the resulting product by heating in the presence of a gas having a mild oxidizing action.

10. A process for the production of structural activated carbon suitable for refining, purifying and decolorizing purposes, which comprises mixing anthracite coal with bituminous coal and a finely divided organic material of vegetable character, and with a binder which chars on heating, compressing the mixture under substantial pressure, subjecting the compressed material to a temperature adequate to carbonize and to char the material of vegetable character and the binder, and activating the resulting product by heating in the presence of a gas having a mild oxidizing action.

11. A process for the production of structural activated carbon suitable for refining, purifying and decolorizing purposes, which comprises mixing a coke, a coking coal and a finely divided organic material of vegetable character, with a binder which chars on heating, compressing the material under substantial pressure, subjecting the compressed material to a temperature adequate to carbonize and to char the material of vegetable character and the binder, and activating the resulting product by heating in the presence of steam.

12. A process for the production of structural activated carbon suitable for refining, purifying and decolorizing purposes, which comprises mixing petroleum coke, a coking coal and comminuted wood, with a binder which chars on heating, compressing the material under substantial pressure, subjecting the compressed material to a temperature adequate to carbonize and to char the comminuted wood and the binder, and activating the resulting product by heating in the presence of steam.

13. A process for the production of structural activated carbon suitable for refining, purifying and decolorizing purposes, which comprises mixing coke, a coking coal and a material comprising wood, with a binder which chars on heating, compressing the mixture under substantial pressure, comminuting the compressed material and subjecting the comminuted product to a temperature adequate to carbonize and to char the wood and the binder therein, activating the resulting product by heating in the presence of steam, and subjecting the charred and activated product to the action of an acid to remove undesirable impurities.

14. A process for the production of structural activated carbon suitable for refining, purifying and decolorizing purposes, which comprises mixing anthracite coal, a coking coal and a material comprising wood, with a binder which chars on heating, compressing the mixture under substantial pressure, comminuting the compressed material and subjecting the comminuted product to a temperature adequate to carbonize and to char the material comprising wood and the binder therein, activating the resulting product by heating in the presence of steam, and subjecting the charred and activated product to the action of an acid to remove undesirable impurities.

15. A process for the production of structural activated carbon suitable for refining, purifying and decolorizing purposes, which comprises subjecting a mixture containing mineral carbon of the class consisting of non-coking, low-volatile coals and cokes, a coking coal and a finely divided solid organic material of non-mineral origin, to substantial pressure, subjecting the compressed material to a temperature adequate to carbonize the same, and activating the resulting product.

16. A process for the production of structural activated carbon suitable for refining, purifying and decolorizing purposes, which comprises subjecting a mixture containing mineral carbon of the class consisting of non-coking, low-volatile coals and cokes, a coking coal, a finely divided solid organic material of non-mineral origin, and a binder which chars on heating, to substantial pressure, subjecting the compressed material to a temperature adequate to carbonize the same and to char the binder, and activating the resulting product.

17. A process for the production of structural activated carbon suitable for refining, purifying and decolorizing purposes, which comprises mixing mineral carbon of the class consisting of low-volatile, non-coking coals and cokes with a coking coal and with a finely divided solid organic material of vegetable character and a binder which chars on heating, compressing the mixture under substantial pressure, subjecting the compressed material to a temperature adequate to carbonize and to char the solid organic material of vegetable character and the binder therein, activating the resulting product by heating in the presence of steam, and subjecting the charred and activated product to the action of an acid to remove undesirable impurities.

18. Activated carbon comprising the activated product of a mixture of solid organic material of non-mineral origin and mineral carbon of the class consisting of low-volatile, non-coking coal and cokes and a uniformly distributed carbonized coking coal and binder.

19. Activated carbon comprising the activated product of a mixture of solid organic material of vegetable character, coke and a uniformly distributed carbonized coking coal and binder.

20. Activated carbon comprising the activated product of a mixture of wood, coke and a uniformly distributed carbonized coking coal and binder.

21. Activated carbon comprising the activated product of a mixture of organic material of animal origin, coke and a uniformly distributed carbonized coking coal and binder.

22. Activated carbon comprising the activated product of a mixture of a solid organic material of vegetable character, a material of animal origin, coke, and a uniformly distributed coking coal and binder.

JACQUE C. MORRELL.